United States Patent [19]
Namba

[11] 3,989,369
[45] Nov. 2, 1976

[54] SCANNING MECHANISM FOR A COPYING APPARATUS

[75] Inventor: Yoshiharu Namba, Webster, N.Y.

[73] Assignee: Rank Xerox, Ltd., London, England

[22] Filed: Jan. 10, 1975

[21] Appl. No.: 540,187

[52] U.S. Cl. .................................. 355/8; 355/66
[51] Int. Cl.² ................ G03G 15/30; G03G 15/04
[58] Field of Search ............... 355/8, 47, 48, 49, 50, 355/51, 64, 65, 66; 271/DIG. 9

[56] References Cited
UNITED STATES PATENTS

| | | | |
|---|---|---|---|
| 3,554,640 | 1/1971 | Hoskins | 355/8 |
| 3,614,222 | 10/1971 | Post et al. | 355/8 |
| 3,640,615 | 2/1972 | Schaeffer | 355/8 |
| 3,894,801 | 7/1975 | Namba | 355/66 |

*Primary Examiner*—L. T. Hix
*Assistant Examiner*—E. M. O'Connor
*Attorney, Agent, or Firm*—Paul Weinstein; Clarence A. Green; James J. Ralabate

[57] ABSTRACT

A scanning mechanism is provided for a copying apparatus which is adapted to increase the number of copies per unit time when copying a smaller size document by increasing the scanning speed between the end of the shorter document and the normal end of scan position. A copying machine employing the above-noted scanning mechanism also forms part of the invention.

10 Claims, 5 Drawing Figures

SCANNING MECHANISM FOR A COPYING APPARATUS

This invention relates to a scanning mechanism for a copying apparatus which permits copying of different size documents. The mechanism is adapted to provide an increased number of copies per unit time when copying a smaller size document.

In a conventional copying apparatus, for example, one for copying a document of Japanese $B_4$ size, there is an idle scanning period when copying a shorter document, such as Japanese $A_4$ size, due to the difference in the lengths between the $B_4$ and $A_4$ sizes. The conventional apparatus obtains the same number of copies per unit time when copying either the $A_4$ size or the $B_4$ size even though a document of $A_4$ size is shorter than the $B_4$ size.

One approach to this problem has been to increase the copy rate of the apparatus for shorter documents by early flyback of the scanning optics as illustrated in U.S. Pat. Nos. 2,945,434 and 3,062,095.

The present invention provides a scanning mechanism which is adapted to increase the number of copies per unit time when copying a smaller size document by increasing the scanning speed between the end of the shorter document and the normal end of scan position.

Figure 1:
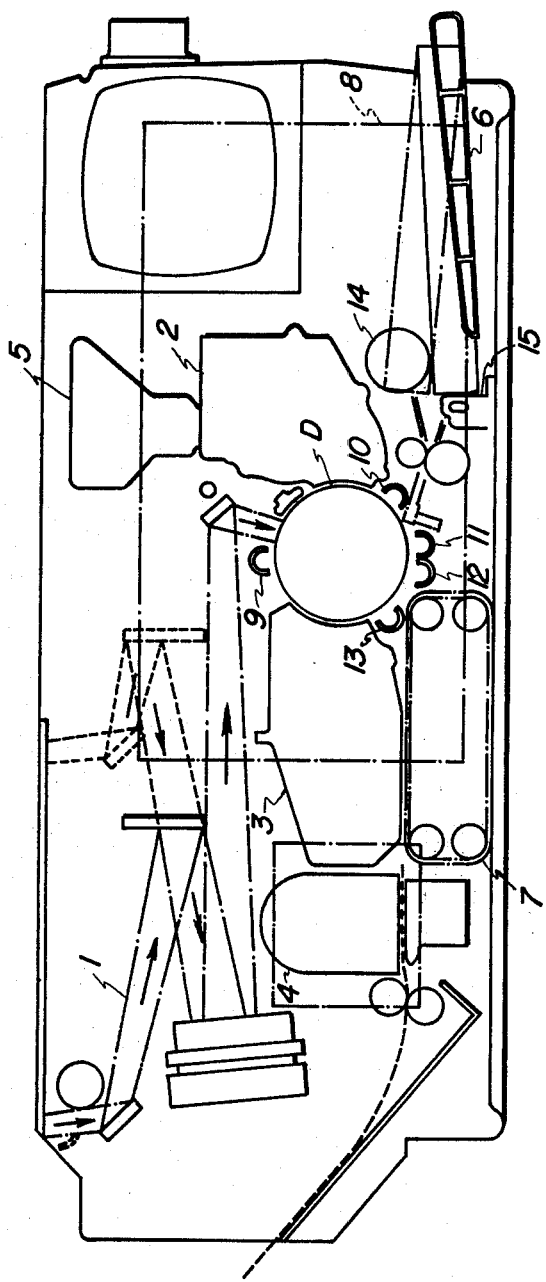
FIG. 1 shows the construction of a copying apparatus which includes the scanning apparatus in accordance with the present invention.

Referring now to the drawings, and more specifically to FIG. 1, the invention will be more fully illustrated by means of a specific embodiment thereof.

FIG. 1 shows the construction of an electronic copying apparatus incorporating the mechanism according to the invention. The copying apparatus includes an illumination exposure system 1, a magnetic brush developing station 2, a blade cleaning station 3, a fuser 4, a toner dispenser 5, a pivotable cassette try 6, a paper transport 7, a power supply 8, a charge corotron 9, aa pretransfer corotron 10, a transfer corotron 11, a detacking corotron 12, a pre-clean corotron 13, a feed roll 14, a registration gate 15, and a photoconductive drum D, respectively.

Figure 2:
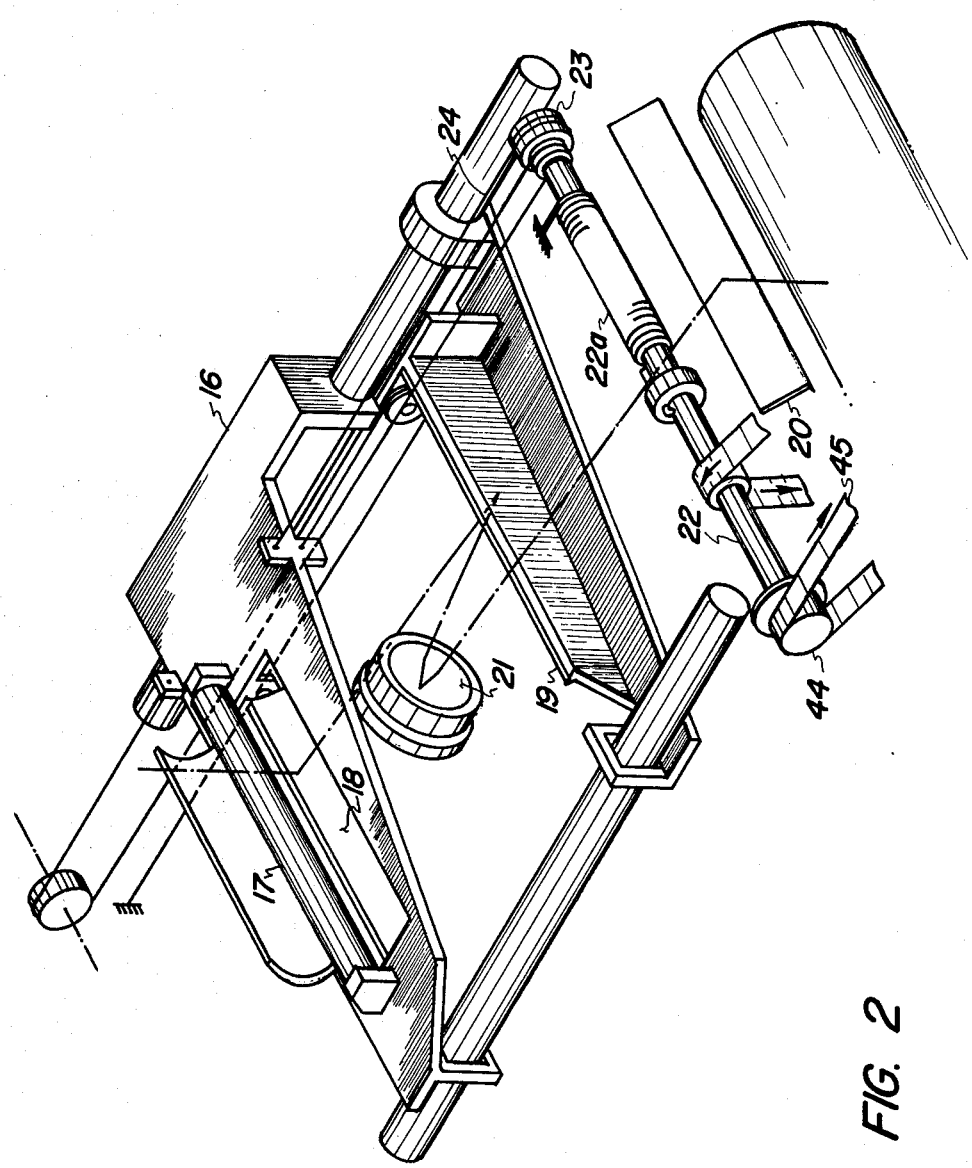
FIG. 2 is aa perspective view showing the construction of the exposure system of the copying apparatus of FIG. 1.

FIG. 2 shows the exposure system 1, which comprises a carriage 16, a lamp 17, mirrors 18, 19 and 20, and a half-lens 21. The carriage 16 is arranged to perform scanning of a document and flyback by the rotation of the scanning shaft 22 through the cable 24. Carriage return is provided by a return spring 22a.

Figure 3:
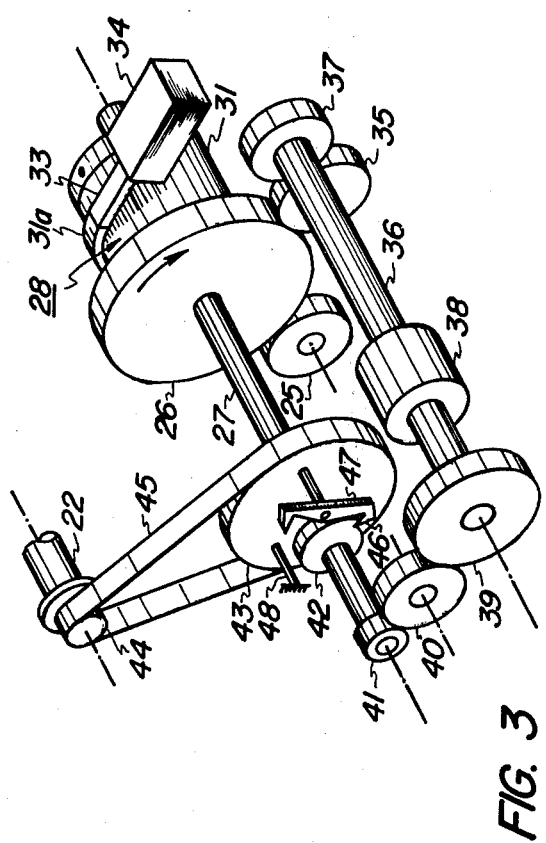
FIG. 3 is a perspective view showing the construction of the drive section for the exposure system of FIG. 2.

FIG. 3 shows the drive mechanism for the scanning shaft 22, comprising a drive gear 25, an input gear 26 engaging the drive gear 25 and a main shaft 27 passing through the core of the gear 26. The mechanism further includes a spring clutch 28 which selectively connects the input gear 26 with main shaft 27 in only one direction of rotation.

Figure 4:
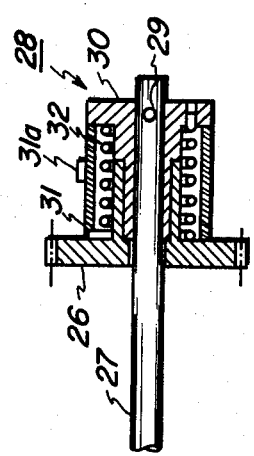
FIG. 4 is a cross-sectional view showing the construction of a spring clutch shown in FIG. 3.

As shown in FIG. 4, the spring clutch 28 comprises the sleeve 30 which is fixed to the main shaft 27 by the pin 29. The input gear 26 rotatably engages the sleeve 30. A stop collar 31 is enclosingly engaged to the above boss part and provided with the protruding lobe 31a on its outer circumference. A lap spring 32 is interposed between the boss part and the stop collar 31 while having one end fixed to the sleeve 30 at the output side and another end lock to the stop collar 31 with some free movement allowable. The lap spring 32 is coiled in the inverse direction to the direction of rotation of input gear 26. The lap spring 32 is arranged to be loose so as to break the connection between the input gear 26 and the sleeve 30 at the output side in the OFF condition when the stop collar is stopped by applying the click member 33 to the lobe 31a while rotating the input gear 26. The lap spring 32 is tightened by the rotation of the input gear 26 so as to have a smaller diameter and connect each boss part of the input gear 26 and the sleeve 30 at the output side in the ON condition when the click member 33 is detached from the lobe 31a. The click member is operated by means of a solenoid 34.

Referring again to FIG. 3, the input gear 26 is engaged through the idler gear 35 with the gear 37 coupled to the counter shaft 36. An electromagnetic clutch 38 is provided in the counter shaft 36. The gear 39 is fixed to the output side of the clutch 38 and is engaged through the idler gear 40 with the gear 41 coupled to the main shaft 27. The gear ratio of the gear 39 to the gear 41 is arranged so as to increase the speed of rotation of the main shaft 27 by a pre-determined multiple as compared to the speed of rotation imparted by the drive gear 25 and the input gear 26. There is also provided a collar 42 fixed to the main shaft 27 and a pulley 43 adjacent to the collar 42 which is rotatably coupled to the main shaft 27. A belt 45 is wrapped around the pulley 43 and the pulley 44 which is fixed to the scanning shaft 22 of the exposure system 1. The scanning shaft 22 is rotated by the rotation of the pulley 43 on the main shaft 27. The outer circumference of the collar 42 is provided with a notch 46. The notch 46 is so engaged with a click member 47 that it will be disengaged from the click member when the member contacts the shaft 48 and that the rotation of the main shaft 27 is intermittenly imparted to the pulley 43 by means of the collar 42 and the click member 47.

Figure 5:
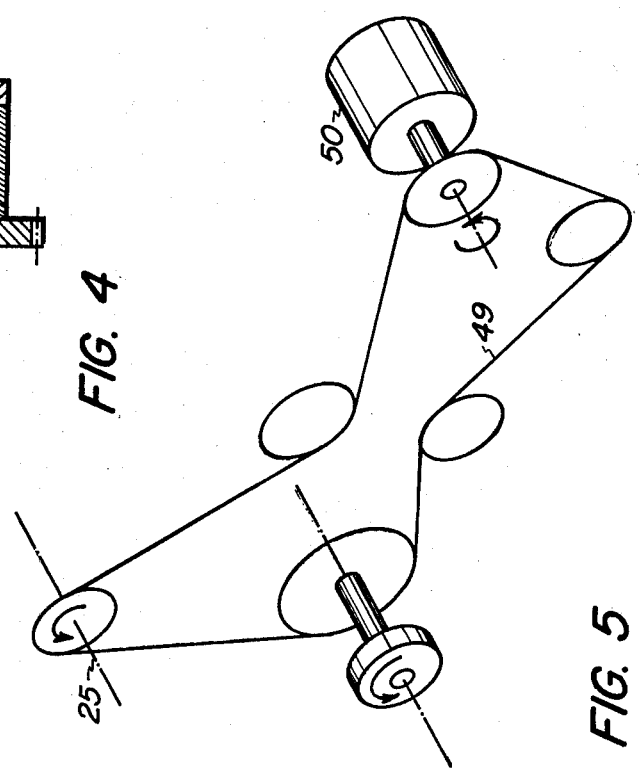
FIG. 5 is a schematic perspective view showing a drive mechanism for the apparatus of FIG. 3.

As shown in FIG. 5, the drive gear 25 is driven from the motor 50 by means of the chain 49 wrapped on a plurality of the idler pulleys.

Now referring to FIGS. 2 and 3, the transmission of torque in the above-described construction will be described. The spring clutch 28 and the electromagnetic clutch 38 should be in the off condition when no copying operation is being performed. In this condition, the counter shaft 36 is rotated through the drive gear 25, input gear 26, idler gear 35 and the gear 37. At this time, the counter shaft 36 idles against the gear 39, since the electromagnetic clutch 38 is turned off. The spring clutch 28 cannot impart its movement to the scanning shaft 22 as movement is not imparted from the input gear 26 to the main shaft 27, resulting in no rotation of the main shaft 27.

For the next scanning, the spring clutch 28 is turned on and the electromagnetic clutch 38 is turned off. In this condition, the rotation of input gear 26 driven with the drive gear 25 is imparted to the main shaft 27 through the spring clutch 28. The rotation of main shaft 27 is imparted to the scanning shaft 22 through the collar 42, the click member 47, pulley 43, belt 45 and pulley 44. The rotation of the scanning shaft 22 shifts the carriage 16 for scanning the document. At this time, the gear 39 coupled to the shaft 36 is rotated, receiving the movement of main shaft 27, but it is idle because the electromagnetic clutch 38 is turned off. After completion of scanning, the collar 42 and the click member 47 are disengaged and the carriage 16 is flown back to the start of scan position by means of the return spring 25. In this example, when the scanning for a $B_4$ size document is completed, the output side of spring clutch 28 is positioned at 325° 03' after completion of the scanning. It continues to rotate during the flyback and is held by means of lobe 31a at 360° (one rotation) where it is stopped. The flyback is also stopped just before this time.

For copying a document of $A_4$ size which is shorter than the above $B_4$ size, thhe scanning procedure and the operation thereof are the same as those for the above-described $B_4$ size example except that the output side of the spring clutch 28 will be positioned at 271° 51' after completion of the scanning for the $A_4$ size document. At the completion of scanning for the $A_4$ size document, the electromagnetic clutch 38 should be turned on and turned off before the output side of the spring clutch 28 reaches 360°. If the above-setting is performed, the rotation of the counter shaft 36 driven with the drive gear 25 is imparted to the gear 39 through the electromagnetic clutch 38, and further imparted to the main shaft 27 through the gear 39. The rotating speed imparted from the counter shaft 36 is faster by the predetermined rate than that from the gear 25 through the input gear 26 and the spring clutch 28, therefore, the scanning speed of the carriage 16 is increased by the above predetermined rate as soon as the scanning of the shorter $A_4$ size document is completed. That is, while the position of the output side of the spring clutch 28 is at 325° 03' upon the completion of the scanning for a $B_4$ size document, it is at 276° 51' upon the completion of scanning for an $A_4$ size document. However the output side of the spring clutch 28 is forwarded in its rotation by the increased rotating speed of the main shaft 27 so that the rotation from 271° 51' to 360° after the scanning of an $A_4$ size document is performed within the same time as required for the rotation from 325° 03' to 360 ° in case of $B_4$ size document.

Therefore, the time required for one cycle for an $A_4$ sice document becomes shorter than that for a $B_4$ size, and thereby the number of $A_4$ size copies per unit time is greater than the number of $B_4$ size copies per unit time.

In the above-described operation, the difference in the rotating speed between the rotation of input gear 26 driven with the drive gear 25 and the rotation of the main shaft 27 rotating faster than the former is absorbed by the one-way operation of the spring clutch 28.

After completion of above operation, the spring clutch 28 will be turned off to be ready for the next scan.

In summary, according to the preferred embodiment, the scanning mechanism of a copying apparatus is so constructed that it has an amplifying apparatus including a normally releasing clutch interposed between the input and output sides of a spring clutch 28 and is capable of forwarding the angle at the output side of the spring clutch 28 to the input side of closing the normally releasing clutch at need. Therefore, on occasion of copying a smaller size document, the number of copies per unit can be increased. There results a higher copying efficiency by increasing the scanning speed by the rate equivalent to the difference of paper space so as to pass there with a faster speed.

The scanning mechanism of the present invention is useful with a wide variety of cophing apparatuses as, for example, those illustrated in the previously noted U.S. patents.

Therefore, it is apparent that there has been provided in accordance with this invention a scanning mechanism for a copying apparatus which fully satisfies the objects, aims, and advantages set forth hereinbefore. While the invention has been described in conjunction with specific embodiments thereof, it is evident that many alternatives, modifications, and variations will be apparent to those skilled in the art in light of the foregoing description. Accordingly, it is intended to embrace all such alternatives, modifications and variations as fall within the spirit and broad scope of the appended claims.

What is claimed is:

1. Scanning apparatus for scanning first documents with up to a first length with a first scanning cycle time and for scanning second documents with up to a second length shorter than the first length with a second scanning cycle time less than said first scanning cycle time, said apparatus comprising:
    means for scanning said first document along a desired path at a first speed over a first distance corresponding to said first length to form an exposure of said first document; and
    means for scanning said second document along said path at said first speed over a second distance shorter than said first distance and corresponding to said second length to form an exposure of said second document and for scanning a remaining distance along said path up to said first distance at a second speed;
    whereby for shorter documents an increased number of scan cycles per unit time may be obtained.

2. An apparatus as in claim 1, wherein said means for scanning said first document and said means for scanning said second document comprise at least one mirror arranged to perform scanning of said documents.

3. An apparatus as in claim 2, wherein said means for scanning said first document comprises means for driving said mirror along said path to scan said first document at said first speed and wherein said means for scanning said second document comprises means for driving said mirror along said path at said first speed over said second distance and for driving said mirror along said path at said second speed over said remaining distance.

4. An apparatus as in claim 3, wherein said drive means for said first and second document scanning means comprise a single drive means including means for driving said mirror at said first speed, and means for driving said mirror at said second speed and means for selecting said first or second speed in relation to the length of said document being scanned.

5. An apparatus as in claim 4, wherein said selection means comprises a self-releasing clutch.

6. An apparatus as in claim 5, wherein said self-releasing clutch comprises an electromagnetic clutch.

7. An apparatus as in claim 5, wherein said single drive means includes an amplifying mechanism comprising:

a spring clutch and wherein said self-releasing clutch is interposed between the input and output sides of said spring clutch, whereby the rotation of the output side of said spring clutch is forwarded to match the rotation of the input of said spring clutch by engaging the self-releasing clutch for a predetermined period of time.

8. In a copying apparatus for copying documents of different lengths, said apparatus including a scanning apparatus for scanning first documents with up to a first length with a first scanning cycle time and for scanning second documents with up to a second length shorter than said first length with a second scanning cycle time less than said first scanning cycle time, said apparatus comprising:

means for scanning said first document along a desired path at a first speed over a first distance corresponding to said first length to form an exposure of said first document; and means for scanning said second document along said path at said first speed over a second distance shorter than said first distance and corresponding to said second length to form an exposure of said second document and for scanning a remaining distance along said path up to said first distance at a second speed greater than said first speed;

whereby for shorter documents an increased number of scan cycles per unit time may be obtained.

9. An apparatus as in claim 8, wherein said means for scanning said first document and said means for scanning said second document comprise at least one mirror arranged to perform scanning of said documents.

10. An apparatus as in claim 9, wherein said means for scanning said first document comprises, means for driving said mirror along said path to scan said first document at said first speed and wherein said means for scanning said second document comprises, means for driving said mirror along said path at said first speed over said second distance and for driving said mirror at said second speed over said remaining distance.

* * * * *